March 10, 1953  J. B. ARMITAGE ET AL  2,630,717
TRANSMISSION AND CONTROL MECHANISM
Original Filed Jan. 6, 1939  4 Sheets-Sheet 1

INVENTOR.
Joseph B. Armitage
Theodore J. Eserkaln
BY W. D. O'Connor
Attorney

Fig. 2

Patented Mar. 10, 1953

2,630,717

UNITED STATES PATENT OFFICE 2,630,717

TRANSMISSION AND CONTROL MECHANISM

Joseph B. Armitage and Theodore F. Eserkaln, Wauwatosa, Wis., assignors to Kearney & Trecker Corporation, West Allis, Wis., a corporation of Wisconsin Original application January 6, 1939, Serial No. 249,554, now Patent No. 2,415,801, dated February 11, 1947. Divided and this application January 30, 1947, Serial No. 725,374

15 Claims. (Cl. 74—335)

This invention relates, generally, to improvements in transmission mechanism and more particularly to improved rate changing and control mechanism for regulating the operation of machinery.

This specification constitutes a division of application Serial No. 249,554 filed January 6, 1939, that issued February 11, 1947 as Patent No. 2,415,801.

A general object of the invention is to provide an improved rate changing mechanism for transmitting power, together with control apparatus for regulating it.

Another object of this invention is to provide a more efficient actuating and controlling apparatus for a machine tool or the like.

Another object is to provide an improved control system for regulating the rate of relative movement of cooperating machine elements.

Another object is to provide an improved electrical control system for regulating the rate of feeding movement in a machine.

Another object is to provide governing means for regulating the rate of feeding movement in a machine, together with control apparatus adapted to effect reversal in the direction of the feeding movement and operating simultaneously to reverse the action of the rate controlling apparatus.

Another purpose of the invention is to provide improved transmission and control mechanism, such that the rate of one transmission line may be maintained in exact synchronism with the rate of another line as, for example, to maintain a constant rate in spite of tendency in the second transmission to vary its rate, or to duplicate rate variations in the second transmission in accordance with rate variations in the first transmission.

A further purpose is to effect an improved transmission and control mechanism including preferred and improved interlocks or interconnections of control mechanism between a plurality of transmission or control portions.

A further object is to provide improved means for simultaneous operation of clutch devices respectively individual to different portions of a transmission train.

A further object is to provide an improved transmission and control mechanism including a plurality of transmission trains, one of the trains including a stepless rate changer adjusted in response to control mechanism operative at least in part from the other train.

A still further purpose is generally to simplify and improve the construction and operation of transmission and control means for machines, and still other objects will be apparent from the following description taken in connection with the claims.

According to this invention, an improved transmission and control mechanism is utilized in a pattern controlled machine tool for forming contoured surfaces, the control means functioning automatically to maintain the rate of relative feeding movement between a forming tool and a workpiece substantially constant regardless of the shape of the pattern being followed. The rate of actual relative feeding movement between the workpiece and the forming tool may be governed in response to variations in the speed of the guiding surface of the pattern at the point of engagement with the follower. Since the speed of the guiding surface at the point engaged by the follower roller is the same as the speed of the corresponding point on the workpiece that is engaged by the rotary tool, the speed controlling mechanism may be made directly responsive to the peripheral speed of the follower roller, the arangement being such that when the rate of movement of the roller tends to increase, the control mechanism acts to reduce the speed of the driving mechanism effecting the relative feeding movement, or vice versa. By this arrangement, the movement of the pattern and the workpiece is controlled automatically in such manner that the relative feeding rate between the forming tool and the workpiece at the point of contact therebetween is maintained substantially constant to provide a uniform predetermined cutting action regardless of changes in the contour of the surface being formed. The speed control mechanism may be electrically actuated and may be adjusted to provide any desired degree of sensitiveness. To provide for operation of the machine in either direction, the transmission mechanism includes reversing gearing and the control mechanism is provided with reversing means interacting with the reversing gearing.

The foregoing and other objects of this invention, which will become more fully apparent from the following detailed specification, may be achieved by the particular transmission and control mechanism constituting an exemplifying embodiment of the invention that is illustrated in and described in connection with the accompanying drawings, in which.

The particular machine illustrated in the drawings as exemplifying apparatus of the class adapted to utilize transmission mechanism constructed and operated in accordance with the principles of the present invention, is primarily a milling machine of the bed type, although it is to be understood that the invention may be applied to other machines of different construction with equal advantage.

Figure 1:
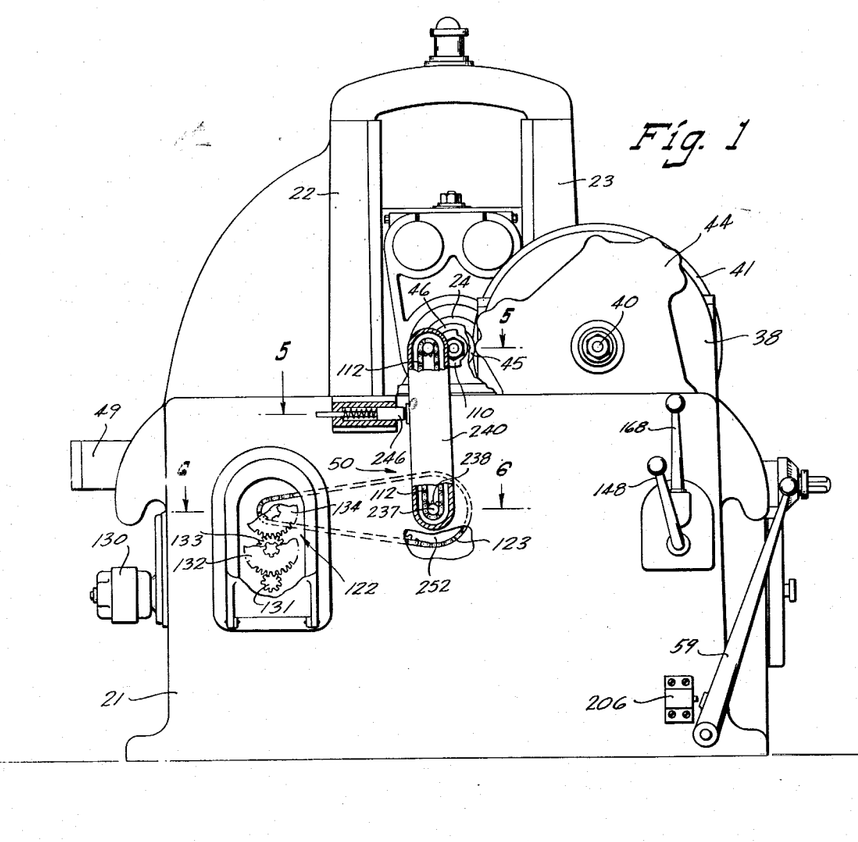
Figure 1 is a view in front elevation of a pattern controlled milling machine constituting apparatus incorporating the invention in a preferred practical form, parts having been broken away to show some of the controlling mechanism.

Referring more specifically to the drawings, and particularly to Fig. 1 thereof, the milling machine there shown incorporates a practical, operative embodiment of the improved transmission mechanism to which this invention is directed, the entire apparatus being fully described herein by way of a complete disclosure. As there shown, the structure comprises essentially a hollow bed or base 21 that constitutes the foundation or frame of the milling machine forming a housing for the driving mechanism for actuating the various movable parts of the apparatus. The base 21 serves also as a support for a pair of spaced uprights 22 and 23 rigidly mounted at the rear thereof and constituting an upstanding column structure for supporting a bodily movable horizontal tool carrying spindle 24.

Figure 2:
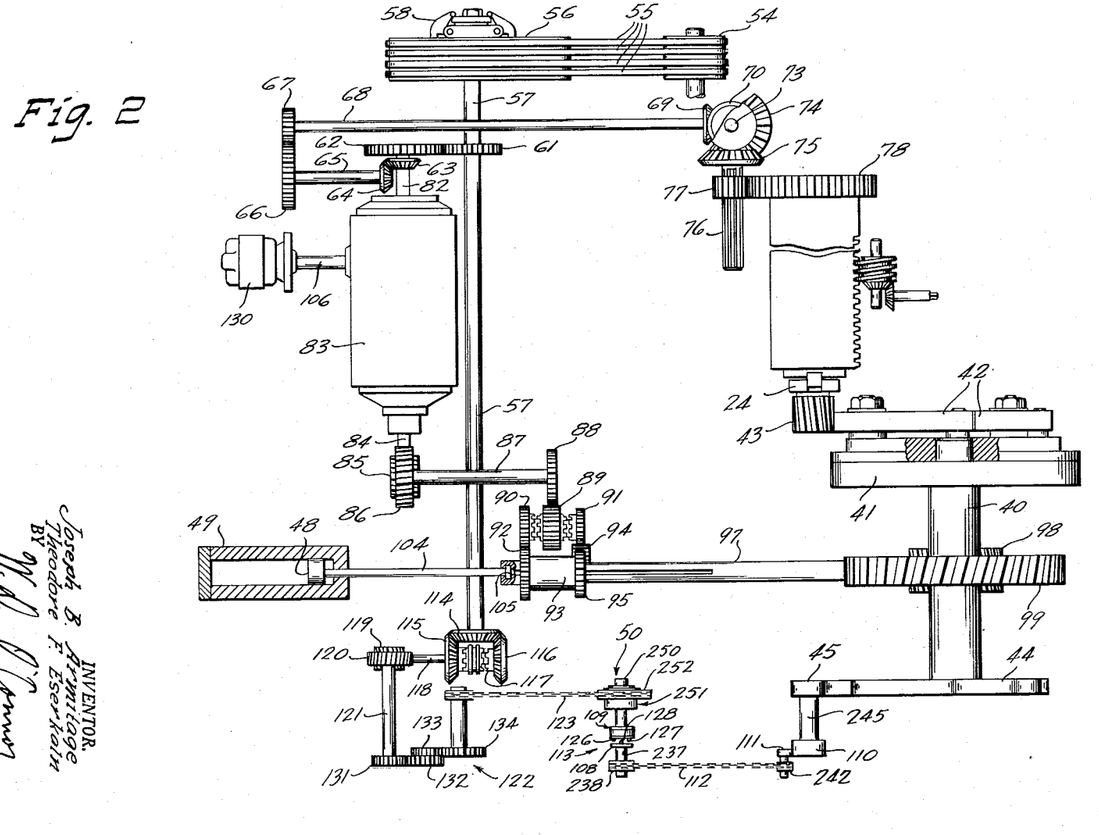
Fig. 2 is an expanded, partly diagrammatic plan view showing a mechanical transmission mechanism for actuating the various movable elements of the machine, and part of the control mechanism.

On the upper surface of the bed 21 in front of the column structure, is slidably mounted a reciprocating work supporting table or platen 38 guided for movement in a path transverse to the axis of the tool spindle 24. The table 38 rotatably supports a work and pattern carrying spindle 40 which is journalled thereon axially parallel with the tool spindle 24 and carries at its inner end adjacent to the spindle 24 a rotatable work holder or supporting fixture 41 adapted to present workpieces 42 in cooperating relationship with a suitable rotary cutter 43 carried by the tool spindle, as best shown in Fig. 2. At its forward or outer end, the work spindle 40 carries a guiding cam or pattern 44 having its outer edge or periphery contoured in a predetermined manner to present a controlling surface that constitutes a guide for machining the workpieces on the fixture 41 to the desired shape.

For cooperating with the rotary guiding pattern 44, there is provided a tracer element in the form of a follower roller 45 which is journalled in a bracket 46 rigidly mounted on the base 21 in position to be engaged by the periphery of the pattern 44 as shown in Fig. 1. The pattern 44 is normally held in contact with the follower roller 45 under a constant yielding pressure by means of a hydraulic piston 48 operating in a cylinder 49 fixed on the frame 21, as shown in Figs. 1 and 2, the arrangement being such that during a machining operation the piston 48 urges the table 38 to the left as seen in Figs. 1 and 2 thereby holding the pattern against the follower roller and urging the workpieces 42 into cutting engagement with the rotary cutter 43 in such manner that upon rotation of the spindle 40 the table 38 will move to the right or left as may be necessary in effecting reproduction of the contour of the guiding pattern upon the workpieces.

In pattern controlled machines as previously constructed, the cutting action of the cutter upon the workpieces varies considerably with changes in the slope or angle of the contour of the pattern, the actual feeding rate being comparatively slow at some points and very much faster at others depending particularly upon the amount of movement effected by steep elements of the pattern. Accordingly, the speed of operation of prior machines is necessarily so limited that the maximum feeding rate at the steepest element of the pattern does not exceed that at which the desired degree of finish is attained, with the result that on other elements of the work, the feeding rate is much lower than it should be, the final effect being that the productice capacity of the machine is seriously restricted.

In accordance with an important feature of this invention, this limitation upon efficient operation is obviated by controlling the rate of relative feeding movement in manner to maintain it substantially constant, the speed of rotation of the pattern and work carrying spindle 40 being varied automatically in such manner that the actual rate of relative feeding movement between the cutter and the surface of the workpiece is maintained substantially constant regardless of the shape of the contour of the pattern being followed. The follower roller 45 is equal in diameter to and disposed coaxially with the cutter 43, and it engages the guiding surface of the pattern 44 in exactly the same manner and at the same angular position that the cutter engages the workpiece. Therefore the rate of movement of the point on the guiding surface of the pattern which engages the follower roller relative to the roller is exactly equal to the rate of movement of the point on the workpiece which is engaged by the cutter 43 relative to the cutter, regardless of angular changes in the position of the contact point. Consequently, to maintain a uniform rate of cutting action, the rate of movement of the point on the pattern which engages the follower roller may be utilized as the controlling factor and as this rate of movement is transmitted directly to the follower roller, the desired cutting rate may be effected by maintaining the speed of the follower roller 45 substantially constant.

To this end, there is provided according to this invention, an improved governing or control mechanism denoted generally by the reference numeral 50 which is actuated by the follower roller 45 and functions to vary the rate of rotation of the work carrying spindle 40 automatically in such manner that the rate of movement of the guiding surface of the pattern 44 at its point of contact with the follower roller is maintained substantially constant, thereby insuring a substantially uniform rate of cutting action between the cutter 43 and the workpiece.

The mechanism for driving the tool spindle 24 and for turning the work supporting spindle 40 includes a driving motor 53 (Fig. 3) mounted within the hollow base 21 and having on its shaft a pulley 54 connected by belts 55 with a main driving pulley 56, as shown in Fig. 2. The driving pulley 56 is selectively connectible to a main driving shaft 57 by means of a friction main clutch 58 selectively actuated by a hand clutch lever 59 disposed at the front of the machine base (Fig. 1) and functioning through suitable connecting mechanism to start or stop the operation of the machine by engaging or disengaging the clutch.

Power for driving the tool spindle 24 is taken from the shaft 57, as shown in Fig. 2, by means of a spur gear 61 meshing with a similar spur gear 62 that carries a bevel gear 63 which meshes with a cooperating bevel gear 64. The bevel gear 64 is mounted on a shaft 65 that extends to a speed changing mechanism at the left side of the machine comprising, in this instance, a pick-off gear 66 on the shaft 65 and a meshing complementary pick-off gear 67 on the end of a parallel horizontal shaft 68, the pick-off gears being interchangeable and reversible in well known manner to provide for driving the spindle at a selected constant speed. The shaft 68 extends inwardly to a point beneath the spindle as shown in Fig. 2 and is provided at its inner end with a bevel gear 69 that meshes with a complementary bevel gear 70 journalled in the bed 21. The gear 70 has spindled engagement with a vertically disposed splined shaft 73 which extends upwardly into and is rotatably supported in the column structure, the splined connection permitting vertical adjustment of the spindle without interfering with the driving connection. At its upper end within the column, the shaft 73 is provided with a bevel gear 74 that meshes with a bevel gear 75 on the end of a horizontally disposed splined shaft 76. The shaft 76 is disposed parallel with the spindle 24 and has slidably mounted thereon a spur pinion 77 that meshes with a spur gear wheel 78 on the inner end of the spindle, the arrangement being such that when the spindle is adjusted axially, the pinion 77 will slide along the splined shaft 76 to maintain the driving connection.

Power for driving the work and pattern supporting spindle 40 is likewise taken from the main driving shaft 57 through the spur gears 61 and 62, the gear 62 being fixed on an in-put shaft 82 at one end of a variable speed transmission unit or rate changer 83 which has at its other end an out-put shaft 84. The out-put shaft 84 of the transmission unit is provided with a worm 85 that meshes with and drives a worm wheel 86 fixed on a horizontal shaft 87, as shown in Fig. 2. The shaft 87 carries a spur gear 88 that meshes with a slidably mounted clutch gear 89 having clutch teeth which may be engaged selectively with complementary teeth of either a clutch gear 90 or a clutch gear 91 to constitute a reversing mechanism for the work spindle drive. As shown, the gear 90 meshes directly with a gear 92 on a driving sleeve 93 in manner to rotate it in one direction, while the gear 91 meshes with an idler gear 94 that in turn meshes with a gear 95 on the sleeve 93 for rotating it in the opposite direction.

The sleeve 93 is provided with an internal spline which slidably engages a splined shaft 97 in manner to provide a driving connection and at the same time to permit endwise movement of the shaft relative to the sleeve. The shaft 97 is journalled in the table 38 for movement with it and carries a worm 98 that meshes with a cooperating worm wheel 99 on the work and pattern supporting spindle 40, the arrangement being such that the spindle 40 may be driven in either direction at the rate determined by the transmission unit 83.

As shown in Fig. 2, the table actuating piston 48 is provided with a piston rod 104, the rod 104 being connected by a rotatable joint or thrust coupling 105 directly to the end of the shaft 97 in such manner that pressure exerted upon the piston 48 in either direction causes the piston rod 104 to move the shaft 97 and consequently the table 38 in the corresponding direction.

The transmission unit or rate changer 83 is preferably of the infinitely variable type capable of effecting stepless changes in speed throughout a considerable range of action, adjustment thereof being accomplished by rotation of a speed controlling shaft 106. The operation of the unit may be in accordance with any of several well known systems, its mechanism being either mechanical, hydraulic, or electrical in character, the particular construction being of no consequence in this instance.

When the machine is in operation, pressure is applied to the piston 48 in the direction to force the table 38 to the left thereby engaging the pattern 44 with the follower roller 45, as appears in Figs. 1 and 2. As previously explained, the follower roller 45 is equal in diameter to, and is disposed in axial alignment with the cutter 43, the arrangement being such that the follower roller engages the pattern 44 in a position corresponding exactly to that in which the rotating cutter engages the workpiece 42, with the result that the cutter forms on the workpiece a contour exactly duplicating the guiding surface of the pattern. Since the rate of the relative feeding movement between the workpiece and the cutter at the point of cutting contact is exactly equal to the rate of movement of the guiding surface of the pattern 44 at the point engaged by the follower roller 45, as previously explained, a uniform rate of relative feeding movement between the workpiece 42 and the cutter 43, may be maintained by controlling the rate of rotation of the work holding spindle 40 in response to changes in the speed of the pattern guiding surface at the point of contact with the follower. Furthermore, since the peripheral speed of the roller equals that of the guiding surface at the contact point, and since rollers of different diameters are utilized to correspond with cutters of different sizes, the controlling speed for actuating the governing mechanism 50 may be taken from a point on the periphery of the roller or from an auxiliary roller driven by the roller 45.

In the particular construction shown, the governing mechanism 50 is so arranged that it is more convenient to take the controlling speed from the surface of a second or auxiliary roller 110 of diameter corresponding to that of the roller 45 and operatively connected thereto but disposed farther forward on the machine, instead of directly from the follower roller. Accordingly, the roller 110 is frictionally engaged by a governing or measuring roller 111 of predetermined, fixed diameter, which is operatively connected by means of a chain 112 to drive one rotatable control element 108 of an electrical rate control unit 113 at speeds varying in accordance with changes in the speed of the pattern surface at the contact point. To provide a standard rate or synchronizing action serving as a basis for establishing the predetermined uniform feed rate, another co-axially disposed rotatable element 109 of the control unit 113 is driven continuously at a selectively predetermined standard speed from the main driving shaft 57, as shown in Fig. 2. For this purpose, a bevel gear 114 is provided on the forward end of the shaft 57 in position to have meshing engagement with complementary bevel clutch gears 115 and 116 and constituting therewith a reversing mechanism by means of which the direction of rotation of the element 109 may be selected. A clutch collar 117 disposed between the gears 115 and 116 functions to couple one or the other of these gears to a shaft 118 carrying a worm 119 that meshes with a worm wheel 120 on a shaft 121. The shaft 121 extends to the front of the machine, as appears in Figs. 1 and 2, and drives a rate changing pick-off gear mechanism 122 which is operatively connected by a chain 123 to drive the standard speed element 109 of the control device 113 at a selected constant speed in the desired direction.

The standard speed element 109 of the rate control unit 113 is provided with two arcuately spaced electrical contact elements 126 and 127 arranged to be engaged alternatively by an intermediate contact element 128 carried by the element 108 of the control unit, which is driven at the variable speed corresponding to that of the pattern contact point. Whenever the speed of the guiding surface of the pattern 44 at its point of engagement with the follower roller 45 varies from the predetermined relative cutting rate, the roller 45 and the governing roller 111 vary in speed correspondingly, in manner to cause the variable speed element 108 carrying the contact 128 to speed up or slow down thereby bringing the contact 128 into engagement with one or the other of the contacts 126 and 127 on the standard speed element 109. This establishes an electrical circuit to control a regulating motor 130 connected to turn the control shaft 106 of the variable speed transmission mechanism 83, the motor functioning to so adjust the mechanism that the speed of rotation of the work and pattern carrying spindle 60 is either increased or decreased sufficiently to reestablish and maintain constant the predetermined rate of relative feeding movement between the workpiece 42 and the cutter 43. This regulation of the feeding rate results in a uniform cutting action between the cutter 43 and the workpiece which may be established, by adjusting the rate changer 122, at such rate that the cutter operates most efficiently at all times and, coincidentally, effects a finished surface of predetermined uniform character on all parts of the workpiece.

Since the cutting or feeding rate is controlled by the rate of rotation of the measuring roller 111, and since the rate of rotation of the measuring roller is directly responsive to the linear velocity of the guiding surface at the point of contact with the follower, the controlling action is not dependent upon the diameter of a particular follower roller nor upon the shape of the pattern. Accordingly, the established feed rate remains constant at its predetermined value regardless of the fact that follower rollers of different diameters may be utilized to correspond with various cutters or that the pattern may be changed for one of a different contour. By reason of this arrangement, the actual feed rate may be predetermined accurately in the usual manner merely by inserting appropriate pick-off gears 131, 132, 133 and 134 in the speed changing gear mechanism 122, in accordance with the indications of a feed rate chart or other well known means. Consequently, the desired feed rate may be established in advance at that best suited to the conditions of the work, in order to obtain the maximum rate of machining action consistent with the desired degree of finish, regardless of the shape or size of the pattern or the diameter of the cutting tool and follower roller.

Figures 3, 4:
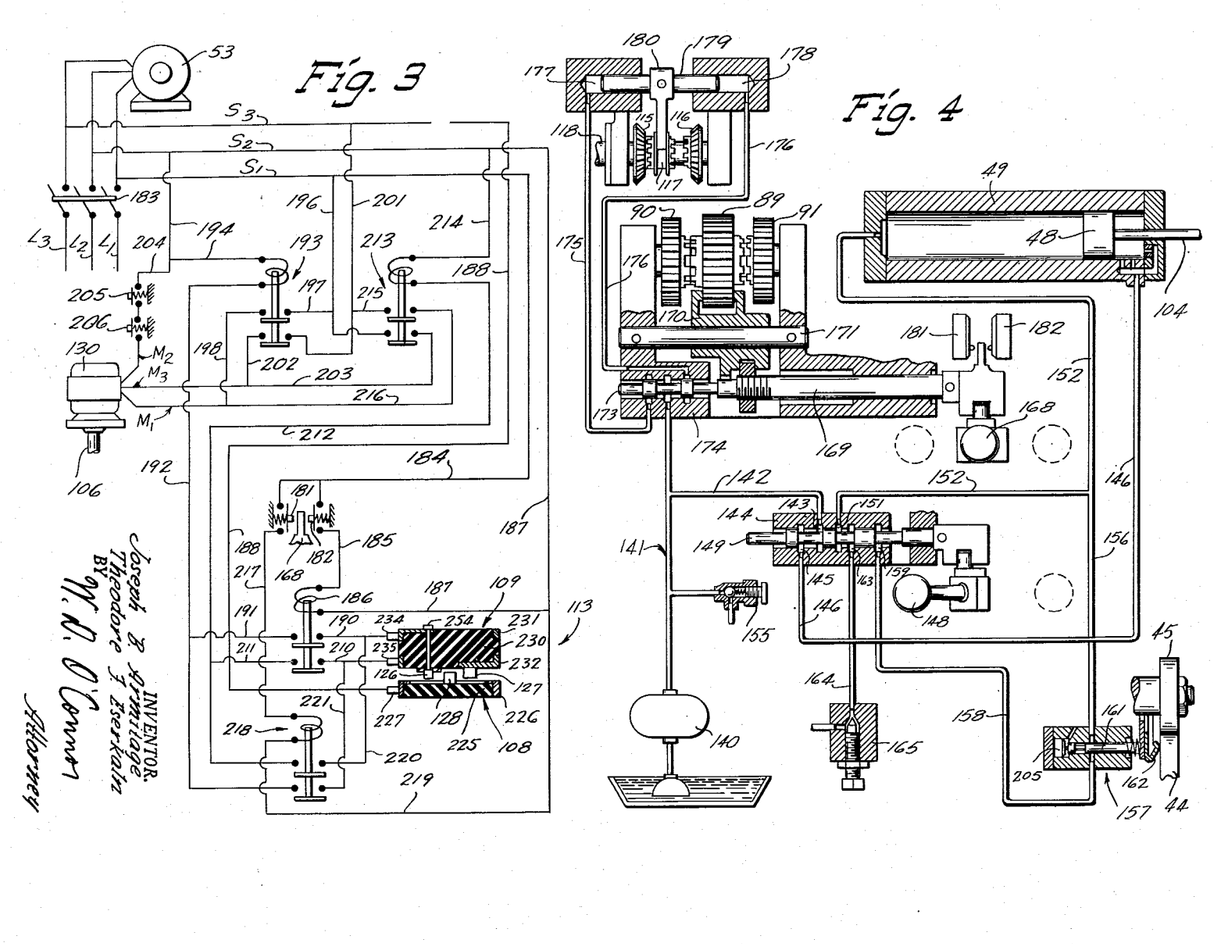
Fig. 3 is a schematic circuit diagram of an electrical control system forming part of the control mechanism of the machine.
Fig. 4 is a diagrammatic view of a hydraulic control circuit and some of the apparatus associated therewith for hydraulically controlling the actuation of various parts of the machine.

The hydraulic pressure for acting upon the piston 48 to retain the pattern 44 in contact with the follower roller 45 as previously described, is derived from a pump 140 represented diagrammatically in Fig. 4. As indicated in the hydraulic circuit diagram, the pump 140 forces liquid under pressure through a conduit 141 and a branch conduit 142 to a port 143 in a valve casing 144 which is then in communication with a port 145 through which the pressure liquid flows into a conduit 146 leading to the right end of the cylinder 49, thereby exerting pressure to the left upon the piston 48 and urging the table 38 to the left to engage the pattern with the follower roller as previously explained.

In order to retract the pattern and workpiece from engagement with the follower roller and the cutter respectively, as may be required to permit changing the workpiece or for substituting a different pattern, a control lever 148 mounted on the front of the machine, as shown in Fig. 1, may be moved to the right, thereby moving a valve plunger 149, to which it is operatively connected, to the right within the valve casing 144, as viewed in Fig. 4. This movement results in the plunger disconnecting the port 143 from the port 145 leading to the right end of the cylinder 49 and establishing a connection between the port 143 and a port 151 which communicates with a conduit 152 leading to the left end of the cylinder. Pressure exerted through the conduit 152 upon the left face of the piston 48 thereupon causes the work-carrying table 38 to move to the right, the liquid in the right end of the cylinder 49 escaping through the conduit 146 and the port 145 which is then open to atmosphere through the left end of the valve casing 144.

After the required adjustments to the pattern and workpiece have been effected, the table 38 may be advanced to the left into the zone of cutting action to reengage the workpiece with the cutter 43; this is selectively accomplished by moving the control lever 148 to the left to the position shown in Figs. 1 and 4. This reestablishes the flow of pressure liquid through the ports 143 and 145 and the conduit 146 into the right end of the cylinder 49 in manner to move the piston 48 and the table 38 to the left at a rapid rate. The liquid in the left end of the cylinder then escapes by way of the conduit 152 and a conduit 156 through an exhaust valve 157 and a conduit 158 to a port 159 in the valve casing 144, which is then open to atmosphere through the right end of the valve casing.

Figures 5, 9:
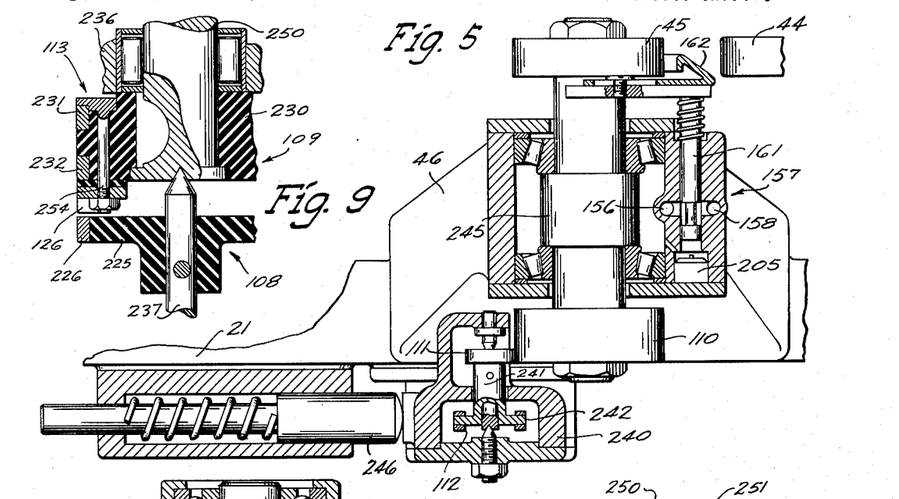
Fig. 5 is an enlarged detail view of part of the feed rate controlling mechanism, taken generally in horizontal section substantially along the line 5—5 in Fig. 1.
Fig. 9 is another enlarged fragmentary view of the electrical control unit, taken in longitudinal section generally along the line 9—9 in Fig. 7.

Since the cutter of the workpieces might be damaged if they were brought together at the rapid rate of movement of the table, means are provided for controlling the escape of exhaust liquid to reduce the rate of movement to a predetermined feed rate just prior to the engagement, thereby avoiding shock. For this purpose, the exhaust valve 157 is provided with a spring urged plunger 161 carrying on its outer end a shoe 162 presenting an angular face which is disposed to be engaged by one edge of the pattern 44 and moved side and inwardly as shown in Figs. 4 and 5, as the pattern 44 moves into engagement with the follower roller 45. As shown, the valve plunger 161 thereupon closes the passageway through the exhaust valve 157 and prevents further escape of liquid through the conduit 158 and the open port 159. The liquid remaining in the cylinder 49 is then restricted to escape through the conduit 152 and the port 151 which is then in communication with a port 163 connected with a conduit 164 leading to an adjustable feed rate throttle valve 165. The throttle valve 165 permits the escape of exhaust liquid at a restricted rate to limit further movement of the workpiece toward the cutter to a predetermined relatively slow feed rate. After the workpiece is brought into contact with the cutter, a steady force is exerted upon the piston 48 by the full pressure of the liquid, the pressure being determined by the setting of an adjustable relief valve 155.

When it is desired to reverse the direction of rotation of the work supporting spindle 40 in order to effect the cutting action in the opposite direction, the reverse clutch gear 89 in the driving mechanism may be shifted by means of a reverse lever 168 mounted on the front of the machine, as shown in Fig. 1. As appears in Fig. 4, the lever 168 is connected to actuate a sliding control rod 169 which moves a shifting fork 170 slidably mounted on a guide rod 171 and engaging opposite sides of the clutch gear 89. To disconnect the driving mechanism from the spindle 40, the lever 168 may be moved to the vertical position shown in Figs. 1 and 4, the clutch gear 89 then being in neutral position between the clutch gears 90 and 91 and disengaged from both of them, as shown. When the lever is moved in either direction to either of the operating positions indicated by the dotted circles in Fig. 4, the clutch gear 89 is moved into engagement with either the clutch gear 90 or the clutch gear 91 to effect turning movement of the spindle 40 in the one or the other direction.

When the direction of rotation of the spindle 40 is changed, the variable speed element 108 of the electrical control unit 113 is driven in the opposite direction by the governing roller 111 and the connecting chain 112. Consequently, in order to obtain the required synchronizing action, the direction of rotation of the standard speed element 109 must be reversed also. This is effected simultaneously with reversal of the spindle 40 by hydraulically actuated means for shifting the clutch sleeve 117 of the bevel gear reversing mechanism. As appears in Fig. 4, the reversing control rod 169 is provided at one end with a valve plunger 173 which operates in a valve casing 174 and functions to connect the pressure conduit 141 alternatively to a conduit 175 or a conduit 176 which lead to cylinders 177 and 178, respectively. The cylinders 177 and 178 engage opposite ends of a piston element 179 carrying a shifting fork 180 that engages the clutch collar 117, the arrangement being such that the collar 117 is shifted hydraulically in synchronism with the clutch gear 89 to reverse the standard speed element of the control unit 113 at the same time that the variable speed element is reversed.

By reason of the hydraulic interconnection between the reversers, manual engagement of clutch gear 89 with either of its cooperating clutch gears is not interfered with in the event that the ends of the clutch teeth on the clutch collar 117 abut with the ends of cooperating clutch teeth on the gear 115 or the gear 116. In such case, the clutch gear 89 is free to move into full engagement with its cooperating clutch gear and the hydraulic pressure exerts a continuous force upon the collar 117 for moving it into engaged position as soon as its teeth are turned to mesh with the cooperating clutch teeth.

When the direction of rotation of the variable speed element 108 of the control unit 113 is reversed in consequence of reversing the direction of rotation of the spindle 40, the action of the two contact elements 126 and 127 of the standard speed element 109 is likewise reversed, since the opposite one of these contacts will then be engaged by the intermediate contact 128 whenever excessive speed is transmitted from the pattern to the variable speed element 108, and vice versa. Accordingly, the electrical connections from the contacts 126 and 127 to the regulating motor 130 must be correspondingly reversed by action of the reversing lever 168. For this purpose there is provided a pair of circuit reversing switches 181 and 182 which are associated with and actuated by the reversing lever 168, the arrangement being such that both switches are in the open position when the lever is in neutral, as is shown in the wiring diagram, Fig. 3.

Electrical energy for energizing the main motor 53 and the speed controlling motor 130 is derived from line conductors L1, L2 and L3 through a main starting switch 183, as shown in Fig. 3. Assuming now that the work spindle reversing lever 168 is moved to the right thereby closing the circuit reversing switch 182 for conditioning the control system to operate in a predetermined direction, a circuit is established from the line conductor L1 through the motor starting switch 183, a supply conductor S1, a conductor 184, the closed s witch 182, a conductor 185, the solenoid of a relay 186, and thence through a conductor 187, to a supply conductor S2, the switch 183 and the line conductor L2, thereby closing the relay 186. This establishes connections with the contacts 126 and 127 of the standard speed element 109 for controlling the speed regulating motor 130 during operation of the spindle 40 in the direction corresponding to the position of the lever 168. Either one of the contacts 126 or 127 may now be energized for controlling the motor 130 by contact with the variable speed contact 128, which is connected by a conductor 188 and a supply conductor S3 to the switch 183 and the third line conductor L3. When the variable speed contact 128 is moved into engagement with one of the standard speed contacts, the contact 126, for example, a circuit is completed from supply conductor S3 through conductor 188, and the contact 128, to the contact 126, thence by a conductor 190, the closed relay 186, a conductor 191, and a conductor 192 to the solenoid of an electrically operated motor reversing switch 193, and thence through a conductor 194 to the supply conductor S₂, thereby closing the switch 193.

With the switch 193 closed, three-phase current for actuating the motor 130 in a predetermined direction is drawn from the line conductors L₁, L₂ and L₃ through the switch 183 and the supply conductors S₁, S₂ and S₃ as follows. From the supply conductor S₁, a conductor 196 leads to a conductor 197 which is connected by the closed switch 193 to a conductor 198 that connects with a conductor M₁ leading to the motor 130. From the supply conductor S₃, the circuit leads through a conductor 201 that is connected by the closed switch 193 to a conductor 202, and thence by a conductor M₃ leading to the motor. From the supply conductor S₂, the circuit leads through the conductor 194, a conductor 204, and interrupting switches 205 and 206, to a conductor M₂ leading to the motor. The motor 130 then operates to adjust the transmission mechanism 83 until the predetermined feed rate is reestablished, whereupon the contacts 128 and 126 move out of engagement and the motor stops.

When the variable speed contact 128 is moved into engagement while the other standard speed contact 127, with the lever 168 is permitted to remain in the same position, a different circuit is completed, leading from the supply conductor S₃ through the conductor 183 and the contact 128 to the contact 127, and by a conductor 210, the closed relay 186, a conductor 211 and a conductor 212 to the solenoid of another motor reversing switch 213 and thence by a conductor 214 to the supply conductor S₂, thereby closing the switch 213. With the switch 213 closed, the supply conductor S₁ is now connected, by the conductor 196 and the switch 213, to a conductor 203 and the motor conductor M₃; and the supply conductor S₃ is connected through the conductor 201, a conductor 215 and the switch 213 to a conductor 216 and the motor conductor M₁ thereby interchanging two phases of the motor circuit and causing the motor to operate in a direction opposite from that in which it operates when the contact 126 is engaged and the switch 193 is closed.

If the lever 168 is now moved to the left to actuate the spindle 40 in the opposite direction, the circuit reversing switch 182 is opened and the circuit reversing switch 181 is closed, thereby deenergizing the solenoid of the relay 186 and establishing a circuit from the supply conductor S₁ through the conductor 184, the closed switch 181, and a conductor 217 to the solenoid of another relay 218 and thence to a conductor 219 which connects with the conductor 187 leading to the supply conductor S₂. This results in opening the relay 186 and closing the relay 218. With the relay 218 closed, the contacts 126 and 127 on the constant speed element 109 are connected to the solenoids of the motor reversing switches in opposite manner, so that the contact 126 controls the motor reversing switch 213 while the contact 127 controls the motor reversing switch 193. As shown, the circuit from the contact 126 then extends through the conductor 190 and a conductor 220 to the closed relay 218 and thence to the conductor 212 which leads to the solenoid of the switch 213. The circuit from the contact 127 then extends through the conductor 210 and a conductor 221 to the closed relay 218 and thence to conductor 192 which leads to the solenoid of the switch 193. If the variable speed contact 128 is then moved into engagement with either of the contacts 126 or 127, a regulating effect opposite to that previously described is obtained. By this arrangement, the action of the variable speed transmission regulating motor 130 is so controlled as to compensate for variations in the speed of the guiding surfaces of the pattern 44 in the correct direction regardless of the direction of rotation of the pattern.

Although the described control system is illustrated as functioning to maintain the cutting action of a pattern controlled machine tool substantially constant at the most effective feed rate, as predetermined by adjustment of the rate changing mechanism, it is to be understood that the speed controlling system may be used to advantage in effecting speed control for various other purposes. Furthermore, it may be adapted to effect variable speed operation of one machine element in accordance with the varying speeds of another machine element or in accordance with the speeds established by a controlling element operative to effect a predetermined speed changing sequence.

Figure 6:
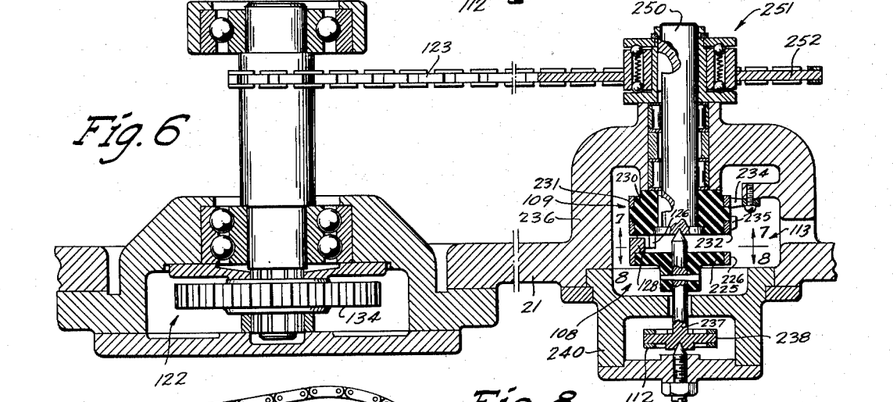
Fig. 6 is an enlarged view in horizontal section of another part of the feed rate controlling mechanism, taken generally along the line 6—6 in Fig. 1.

The two movable elements 108 and 109 of the electrical control unit 113 each comprises a body portion preferably formed of insulating material as indicated in Figs. 3, 6 and 9 of the drawing. As shown, the variable speed element 108 of the unit 113 comprises a plate or disc 225 of insulating material carrying on its periphery a slip ring 226 which is electrically connected to the intermediate contact element 128, and which is mounted on the face of the disc, a brush 227 being provided in slidable contact with the ring 226 for establishing connection between it and the control conductor 188. The constant speed element 109 of the control unit comprises a cylinder 230 of insulating material carrying the contact elements 126 and 127 in arcuately spaced relation on its forward face and having on its periphery a pair of spaced slip rings 231 and 232 electrically connected with the contacts 126 and 127 respectively, as shown in Figs. 3 and 9, and slidably engaged by brushes 234 and 235, respectively connected to the control conductors 190 and 210.

Figure 7:
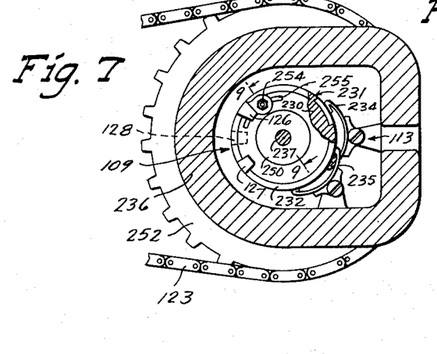
Fig. 7 is an enlarged detailed view of an electrical control unit, taken in vertical section along the line 7—7 in Fig. 6.
Figure 8:
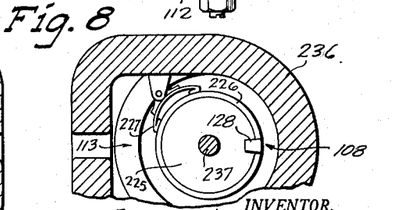
Fig. 8 is a similar sectional view of the control unit, complementary to Fig. 7 and taken on the same vertical plane but looking in the opposite direction as indicated by the arrows 8—8 in Fig. 6.

As appears in Figs. 6, 7 and 8, the several brushes 227, 234 and 235 are mounted, by means of insulating supports, on the interior of a housing 236 formed in the front of the machine bed 21 and arranged to enclose the rotating elements of the electrical control unit 113. As shown in Figs. 6 and 8, the variable speed element 108 is carried by a relatively light shaft 237 extending through the insulating disc 225 and supported at its ends on pivot points for free rotation, its forward end carrying a sprocket wheel 238 which is engaged by the driving chain 112. The chain 112 extends upwardly from the sprocket 238 within a hollow arm or bracket 240 that is pivotally mounted on the front of the machine coaxially with the shaft 237 as shown in Figs. 1 and 6. At its upper end, the arm 240 carries the governing roller 111, as shown in Fig. 5, the roller being fixed on a shaft 241 mounted on pivot points for free rotation and that carries a sprocket 242 which engages the chain 112 extending upward from the sprocket 238. The chain 112 thereby effects a driving connection between the roller 111 and the variable speed element 108, the arrangement being such that the roller and the variable speed element rotate freely and in synchronism in manner to respond quickly and accurately to the slightest change in the speed of rotation of the follower roller 45 and the corresponding roller 110.

As appears in Fig. 5, the follower roller 45 and the corresponding roller 110 are removably mounted on opposite ends of a short shaft 245 journalled in the bracket 46, the arrangement being such that both of these rollers may be removed readily whenever the cutter 43 is changed in order that they may be replaced by rollers corresponding exactly in diameter to the diameter of the new cutter thereby maintaining the predetermined relationship between the pattern and the speed controlling mechanism. The governing roller 111, being mounted on the upper end of the pivoted arm 240, may be adjustably positioned to engage with a roller 110 of any diameter, and a spring urged plunger 246, mounted on the front of the machine as shown in Figs. 1 and 5, is disposed to engage the arm 240 in manner to press the governing roller 111 into contact with the roller 110 with sufficient force to establish frictional driving connection between them. Although in the particular construction shown, it is preferable to utilize the auxiliary corresponding roller 110, it is to be understood that the governing roller 111 may be applied directly to the periphery of the follower roller 45 whenever the construction of the machine favors that arrangement.

The insulating cylinder 230 of the standard speed element 109, which carries the contacts 126 and 127 of the control unit 113, is mounted on the forward end of a shaft 250 journalled in the rear wall of the housing 236, as shown in Fig. 6. At its inner end, the shaft 250 is operatively connected, by means of a torque limiting coupling or slip clutch 251, to a sprocket 252 which is driven from the rate changing mechanism 122 at the predetermined standard rate by means of the chain 123.

In order to control the sensitivity of response of the electrical control unit 113, the contact 126 of the constant speed element 109 is adjustably mounted for arcuate movement relative to the contact 127 along the face of the insulating cylinder 230, by means of a retaining bolt 254 operating in a slot 255, as shown in Fig. 7. By moving the contact 126 close to the contact 127, the range of movement of the intermediate contact 128 may be so reduced that the slightest variation in the speed of the element 108 from that of the constant speed element 109 causes the contact 128 to engage one or the other of contacts 126 and 127, whereby very close regulation of the speed changing transmission mechanism may be achieved, if desired. On the other hand, should it be considered desirable that the regulating motor 130 be energized less frequently in effecting the regulating operation, the contact 126 may be set farther from the contact 127 to afford a greater range of movement to the intermediate contact 128.

In the event that the driving action of the governing roller 111 should be discontinued, either through moving the pattern 44 out of engagement with the follower roller 45 or through disconnecting the work spindle drive by moving the reversing clutch gear 89 to neutral position, while the constant speed element 109 of the control unit continues to rotate, one of two conditions will result; either the variable speed element 108 and the governing roller 111 will be driven by the rotating element 109, or, should the roller 111 be prevented from turning by engagement of the pattern 44 with the follower roller 45 or like reason, the overload clutch 251 will slip, thereby preventing excessive torque from being imparted to the control unit. Under either of these conditions, the contact 128 will remain engaged with either the contact 126 or 127 and the regulating motor 130 will tend to run continuously until the speed changing mechanism 83 has been adjusted to one or the other extreme position, whereupon the motor 130 will stall if not otherwise stopped.

Since unintentional adjusting of the mechanism 83 to an extreme position is undesirable, the previously mentioned interrupting switch 205 is arranged to be actuated by the plunger 161 of the exhaust valve 157 as shown in Figs. 4 and 5, in such manner that whenever the pattern 44 moves out of contact with the follower roller 45 the switch 205 will be opened, thereby deenergizing the motor 130 and preventing it from operating in response to engagement of the contacts in the control unit. Likewise, the motor 130 is deenergized whenever the driving connection to the pattern 44 is disconnected by moving the reversing clutch gear to the neutral position, since both of the reversing switches 181 and 182 are then moved to a disengaged position, as indicated in Figs. 3 and 4, thereby deenergizing the relays 186 and 218 and disconnecting the control unit 113 from the switches controlling the motor 130.

Furthermore, the other previously mentioned interrupting switch 206 is arranged to be actuated by the main clutch lever 59, as shown in Fig. 1, the arrangement being such that when the lever 59 is positioned to disengage the main clutch 58 thereby stopping the work spindle 40, the switch 206 is opened to deenergize the motor 130 to prevent its operation should the contacts remain in an engaged position. Likewise, when the machine is stopped by opening the main motor switch 183, the regulating motor 130 is automatically deenergized and prevented from shifting the speed changing adjusting mechanism to an extreme position, since both the main motor and the regulating motor are energized from the line conductors $L_1$, $L_2$ and $L_3$ through the main switch.

From the foregoing description of the construction and operation of an illustrative machine tool transmission mechanism operating in accordance with the principles of this invention, it is apparent that there has been provided improved transmission and control apparatus that functions to regulate the relative feeding movement of a workpiece and a work forming tool or similar members automatically in such manner as to effect the most efficient operation of the tool and to form on the workpiece a finished surface of uniform character throughout.

Although the foregoing detailed description and the accompanying drawings are directed specifically to particular apparatus exemplifying a preferred construction for the purpose of fully disclosing an operative embodiment of the invention, it is to be understood that the particular structure shown and herein described is intended to be illustrative only, and that various features of the invention may be incorporated in other forms and constructions without departing from the spirit and scope of the invention as defined in the subjoined claims.

The principles of the embodying apparatus having now been fully explained, we hereby claim as our invention:

1. In a rate control mechanism for a transmission including an adjustable rate changer, the combination of power operable adjusting means for said rate changer, a rate control train, a plurality of co-axial elements respectively rotatable through said rate control train and through said rate changer, and means controlling the power operation of said adjusting means in accordance with the relative rotational displacements of said co-axial elements.

2. In a rate control mechanism for a transmission train including an adjustable rate changer and a shiftable motion interrupter, the combination of power operable adjusting means for said rate changer, a rate control train, means normally controlling the power operation of said adjusting means in accordance with the rate of said rate control train, and control means operatively connected to interrupt the operation of said adjusting means whenever said motion interrupter is moved to its interrupting position.

3. In a rate control mechanism for a transmission train including an adjustable rate changer, the combination of power operable means for adjusting said rate changer, a rate control train including a shiftable reverser, means reversibly controlling the power operation of said adjusting means in accordance with the rate of said rate control train, and means reversing the direction effect of said controlling means simultaneously with the shifting of said reverser.

4. In a speed regulating system, the combination with relatively movable elements, of a controllable variable speed transmission mechanism operatively connected to effect relative movement of said elements, an electrical contact member operatively connected to move in accordance with the speed of said relative movement, a cooperating electrical contact member operatively connected to be driven at a predetermined governing speed, and means responsive to cooperation of said contact members to control said variable speed transmission mechanism in manner to maintain said relative movement at a substantially constant predetermined speed.

5. In a machine, the combination with members arranged for relative movement, of transmission mechanism for effecting relative movement of said members selectively at feed rate or at rapid traverse rate, a second transmission mechanism for effecting relative movement of said members at a governed feeding rate, means to regulate said second transmission mechanism automatically, and means operative when said first transmission mechanism is effecting movement at rapid traverse rate to prevent operation of said automatic regulating means for governing said second transmission mechanism.

6. In a machine, the combination with relatively movable elements, of a variable speed drive mechanism for effecting relative movement between said elements, governing means for controlling said variable speed drive mechanism to regulate the rate of said relative movement automatically, means for reversing the direction of operation of said drive mechanism, means for reversing the effect of said governing means, and a control system operative to actuate simultaneously said drive mechanism reversing means and said governor reversing means.

7. In a machine, the combination with a plurality of members arranged for relative movement, of means for effecting relative feeding movement between said members, a pattern and cooperating follower operatively arranged to guide said relative feeding movement, a control element operatively connected to rotate in accordance with the linear speed of the guiding surface of said pattern, a cooperating control element arranged to rotate at a preselected standard speed, a rate changing mechanism operatively connected to drive said standard speed element and adjustable to select said standard speed, and control means responsive to variations in the relative speed of rotation of said control elements and operative to govern said relative feeding rate in accordance with the adjustment of said rate changing mechanism.

8. In a rate control mechanism for a transmission including an adjustable rate changer, the combination of power operable adjusting means for said rate changer, a rate control train, a plurality of rate control elements respectively rotatable through said rate control train and through said rate changer, a plurality of shiftable reversers respectively operable for reversal of rotation of different of said elements, means controlling the power operation of said adjusting means in accordance with the relative rotational displacement of said elements, and means for simultaneously shifting said reversers.

9. In a rate control mechanism for a transmission including an adjustable rate changer, the combination of power operable adjusting means for said rate changer, a rate control train, a plurality of co-axial elements respectively rotatable through said rate control train and through said rate changer, and means reversibly controlling the power operation of said adjusting means including electric circuit means having contacts respectively associated with different of said co-axial elements, and electrical reverser means operable from said contacts.

10. In a rate control mechanism for a transmission train including an adjustable rate changer and a reverser, the combination of power operable means for adjustment of said rate changer in opposite directions, reversibly operable means for controlling the power operation of said adjusting means, and means for reversing the direction effect of said controlling means in accordance with the shifting of said reverser, whereby to maintain the same direction effect of said rate changer adjusting means in either direction position of the reverser.

11. In a rate control mechanism for a transmission train including an adjustable rate changer and a reverser, the combination of a rate control train including a reverser, power operable adjusting means for said rate changer, means for simultaneously shifting said reversers to effect corresponding direction positions thereof, reversibly operable means controlling the power operation of said adjusting means in accordance with the rate of said rate control train, and means for reversing the direction effect of said controlling means simultaneously with the shifting of said reversers.

12. In a control mechanism for a transmission comprising a plurality of power trains each including a shiftable positive-type reverser, the combination of manual means for positive shifting of the reverser of one of said trains, impositive power means for shifting another reverser in another of said trains, and means controlling said impositive power means in accordance with operation of said manual means whereby to effect corresponding simultaneous direction positions of the shifted reversers.

13. In a control mechanism for a transmission comprising a plurality of power trains each including a positive-type reverser, the combination of manual means for effecting the one or the other direction position of one of said reversers, a fluid operable piston device for shifting the other reverser, a reverser valve for said piston device shiftable for effecting the one or the other direction position of said other reverser, and means connecting said reverser valve for operation from said manual means to effect simultaneous corresponding direction positions for both said reversers.

14. In a transmission mechanism, a plurality of gear driving trains, a rate adjustor included in one of said gear driving trains, a reversible type clutch in each of said gear driving trains, interlinking means controlling said clutches for substantially simultaneous operation, a regulating mechanism comprising a plurality of rotatable elements driven by one of said gear trains and by said rate adjustor respectively, power operable adjusting means for said rate changer, and means controlling said rate changer adjusting means in accordance with the relative rotational speed of said rotatable elements in said regulating mechanism.

15. In a machine transmission, an adjustable rate changer, a power actuator arranged to automatically control said rate changer, a governing mechanism comprising coaxially rotatable discs, a plurality of gear trains connected to drive said rate changer and one of said governing mechanism discs respectively, a reversible type clutch in each of said gear driving trains, interlinking control means actuatable for conjoined clutch operation to effect a substantially simultaneous reversal of said gear trains, a secondary driving means connected to rotate another of said governing mechanism discs through said rate adjustor at a predeterminately variable rate, and control means adapted to control said rate changer power actuator in accordance with the relative speed differential of said rotatable discs in said governing mechanism.

JOSEPH B. ARMITAGE.
THEODORE F. ESERKALN.

REFERENCES CITED

The following references are of record in the file of this patent:

UNITED STATES PATENTS

| Number | Name | Date |
| --- | --- | --- |
| 1,994,773 | Lapsley | Mar. 19, 1935 |
| 2,014,632 | Padgett | Sept. 17, 1935 |
| 2,026,827 | Dillon | Jan. 7, 1936 |
| 2,214,986 | Barnes | Sept. 17, 1940 |
| 2,245,017 | Sinclair | June 10, 1941 |
| 2,250,656 | Schjolin | July 29, 1941 |
| 2,267,464 | Iavelli | Dec. 23, 1941 |
| 2,322,479 | Schjolin | June 22, 1943 |
| 2,380,677 | Schjolin | July 31, 1945 |
| 2,401,803 | Turchan et al. | June 11, 1946 |
| 2,417,780 | Parvin | Mar. 18, 1947 |